July 11, 1967
W. M. DICKSON
3,330,314
TREE SAW AND ROOT PLOW
Filed Sept. 10, 1965
2 Sheets-Sheet 1
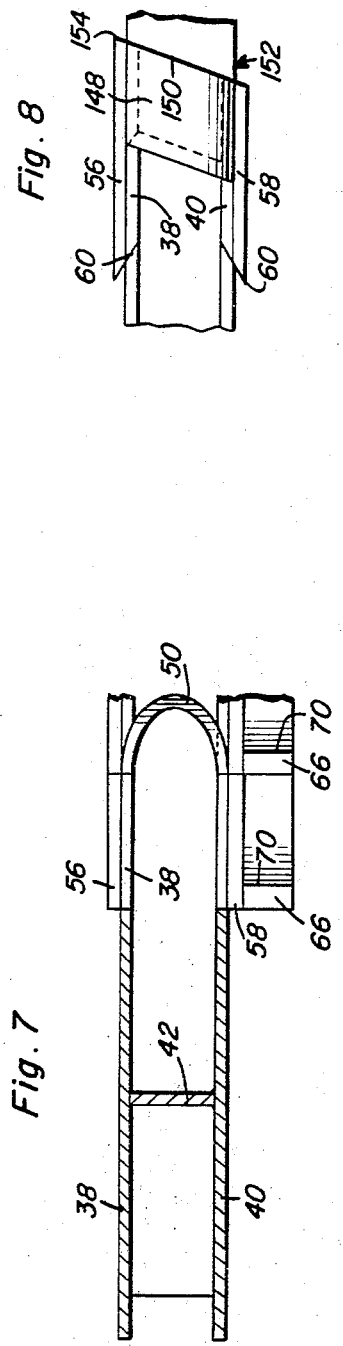
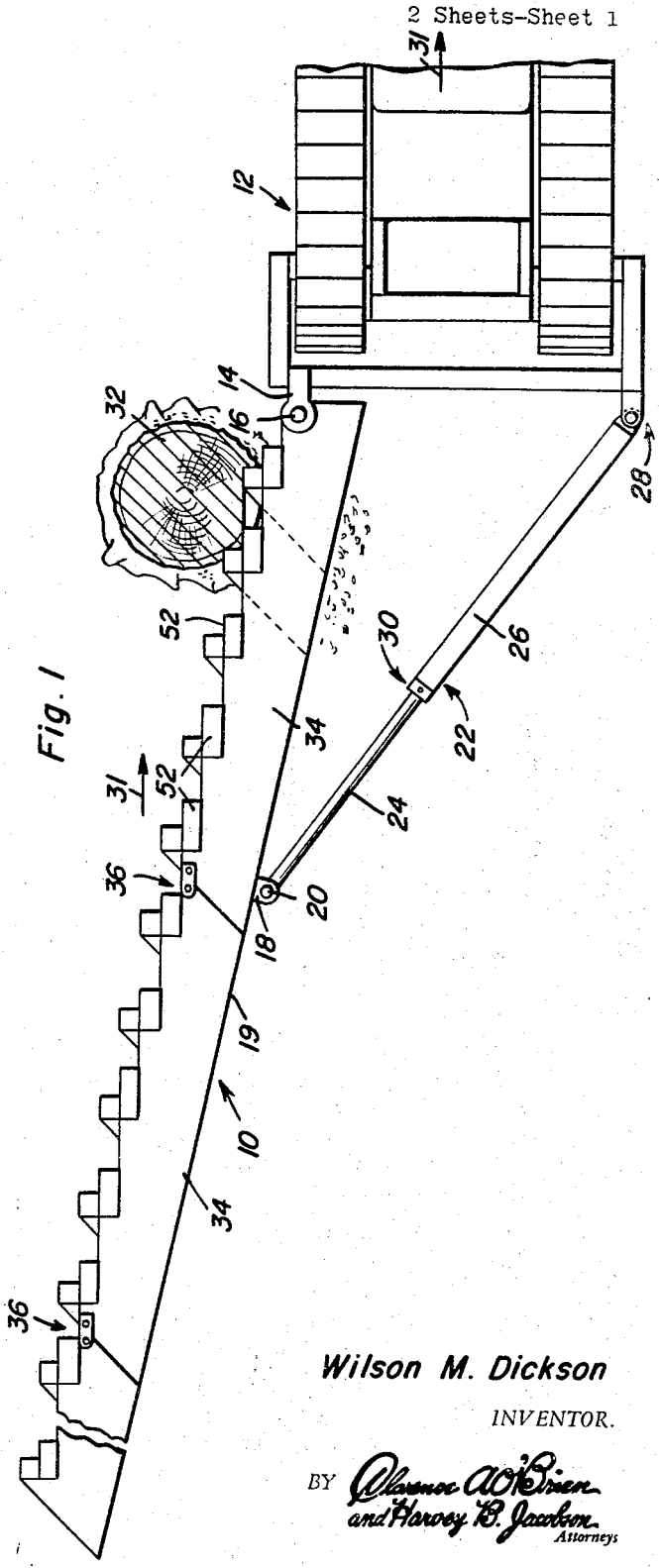
Wilson M. Dickson
INVENTOR.

July 11, 1967  W. M. DICKSON  3,330,314
TREE SAW AND ROOT PLOW
Filed Sept. 10, 1965  2 Sheets-Sheet 2

Wilson M. Dickson
INVENTOR.

BY Clarence A. O'Brien
and Harvey B. Jackson
Attorneys

United States Patent Office 3,330,314
Patented July 11, 1967

3,330,314
TREE SAW AND ROOT PLOW
Wilson M. Dickson, P.O. Box 1204,
Kilgore, Tex. 75662
Filed Sept. 10, 1965, Ser. No. 486,382
12 Claims. (Cl. 144—34)

This invention relates to a tree, root or stump cutter and more particularly to an elongated cutter which is especially adapted to be pulled behind a tractor or other self-propelled vehicle and which reacts upon the surface of the ground laterally offset from such vehicle in order to effectively cut trees, roots or stumps.

A long-standing problem in tree farming or field clearing operations has been in providing means for cutting trees, stumps or roots close to the ground to provide a substantially level surface when the cutting operation is completed. Various vehicle pulled or carried ground-engaging saws have been devised to solve the problem; however, they have proved to be generally unsatisfactory in that they do not ride smoothly over uneven ground surfaces, nor do they provide efficient cutting means for cutting trees, stumps or roots close to the ground.

Accordingly, it is an object of the instant invention to provide an improved vehicle drawn device for cutting trees, stumps or roots.

In accordance with the above object, it is a further object of the present invention to provide a saw which is adapted to be vehicle drawn for sliding along the ground surface and cutting objects laterally adjacent the path of the vehicle travel.

It is another object of the present invention to provide an improved tree saw and root plow tool including a plurality of self-starting cutting edges, the tool operating efficiently over rough or uneven ground surfaces as well as over smooth ground surfaces.

It is a further object of the present invention to provide a vehicle drawn ground riding saw having improved ground riding features which eliminate lateral forces on the pulling vehicle, including means for controlling the lateral movement of the saw, which means also allows the pulling vehicle to turn without excess drag on the vehicle or saw.

A still further object of the present invention is to provide an improved tree saw and root plow having novel and unique cutting edges formed thereon and including a modified form of cutting edge for use therewith.

It is a final object of the present invention to provide a vehicle drawn ground riding sawing device which may be fabricated from readily available materials and constructed in easily replaceable sections providing for quick repair or replacement of dull blades or broken parts of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial plan view illustrating the tree saw and root plow device of the present invention in conjunction with a tractor to which the device is attached;

FIGURE 7 is an enlarged partial vertical sectional view taken substantially on the plane of the line 7—7 of FIGURE 2; and FIGURE 8 is an enlarged partial elevational view similar to that of FIGURE 4 illustrating a modified form of the present invention.

Figure 2:
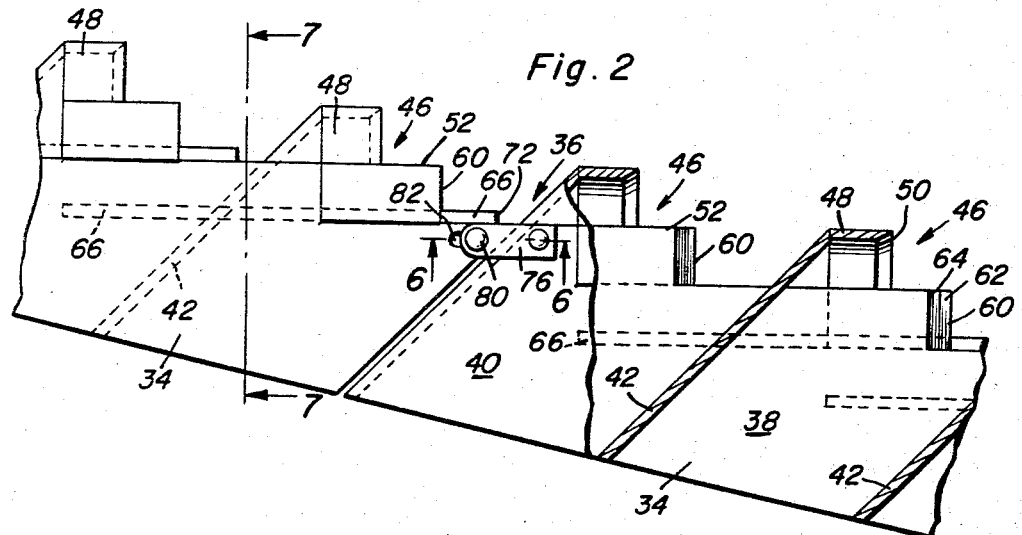
FIGURE 2 is a partial enlarged plan view of a portion of the tree saw and root saw comprising the present invention.
Figure 3:
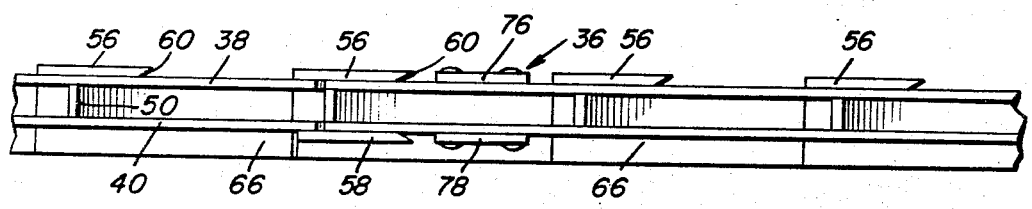
FIGURE 3 is a side elevational view of one side of the saw illustrated in FIGURE 2.
Figure 4:
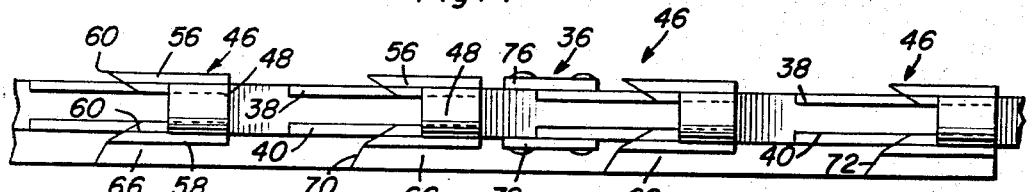
FIGURE 4 is a side elevational view of the opposite side of the saw as illustrated in FIGURE 3.

Referring now more specifically to the drawings, reference numeral 10 generally denotes the tree saw and root plow comprising the present invention. The saw 10 is fastened to a tractor generally denoted at 12 or other land vehicle which is self-propelled by a conventional hitching post 14, which hitching post includes a hinge pin 16 for allowing swinging movement of the saw 10 in a horizontal plane with respect to the tractor. The saw 10 includes a mounting bracket 18 on the rear non-cutting face 19 thereof in which is pivotally connected by hinge pin 20 a telescoping arm generally denoted by reference numeral 22. The arm 22 includes a first section 24 which is adapted to telescope into and out of the second section 26 in a manner well known to those skilled in the art. The section 26 is hingedly attached to the tractor 12 at 28, and includes conventional fastening means generally denoted at 30 for affixing the arm section 24 in relation to the section 26. Thus, it will be apparent that the saw 10 may be fixed in angularly offset lateral position with respect to the direction of travel of tractor 12. Further, inasmuch as the arm 22 is adjustable, the angle between the saw 10 and path of travel of tractor 12 is variable. Thus, it will be apparent that as the tractor 12 moves in the direction indicated by arrow 31, the saw 10 will also move in the direction indicated by the arrow 31 thus contacting and cutting objects such as the tree stump 32 alongside the tractor.

The saw 10 includes a plurality of similar sections 34 which are hingedly attached by the hinged connections generally denoted by reference numeral 36. The sections 34 each include a body portion 35 composed of parallel horizontally disposed upper and lower walls 38 and 40. The walls 38 and 40 are joined by an upstanding intermediate wall 42 which is joined to the upper and lower walls 38 and 40 by being welded thereto or by other conventional attaching means. The walls 38, 40 and 42 are preferably fabricated of heavy duty material, such as iron, steel or the like. The upstanding wall 42 is angularly disposed with respect to the longitudinal centerline of walls 38 and 40 and extends laterally outwardly at one side thereof as denoted by reference numeral 44. The sections 34 include a plurality of cutting sections 46 along the outer cutting face thereof, the sections 46 comprising stepped cutting sections along the outer cutting face of the saw 10. Each cutting section is identical except for its stepped placement along the outer cutting edge of the saw 10 and includes a tooth 48 which comprises a semi-cylindrical member having a frontwardly directed arcuate blade or cutting edge 50. The semi-cylindrical members 48 are joined to the portion of the upstanding wall 42 which extends laterally outwardly of walls 38 and 40 at the edge thereof opposite the cutting edge 50, and together with the wall 42 comprises means for conveying chips laterally outwardly of the body 35. Thus, it will be apparent that as the saw 10 is pulled behind tractor 12 in the direction indicated by arrow 31, the cutting sections 46 will sequentially engage the tree stump or other object adjacent the path of the tractor, at which time the cutting edge 50 will cut chips therefrom. The chips, of course, will be moved into the body of the saw as the saw is pulled through the stumps and will engage the wall 42. Due to the slanted or angularly offset position of the wall 42 with respect to the direction of movement of the saw, the chips will be slid along the wall 42 over bottom wall 40 of the cutting section and thence outwardly of the body of the saw on the side opposite the side containing the cutting section and thence the side containing the cutting section 46. This will allow the saw to continue movement along the path adjacent to the tractor 12 without being jammed or congested by chips or the like.

Figures 5, 6:
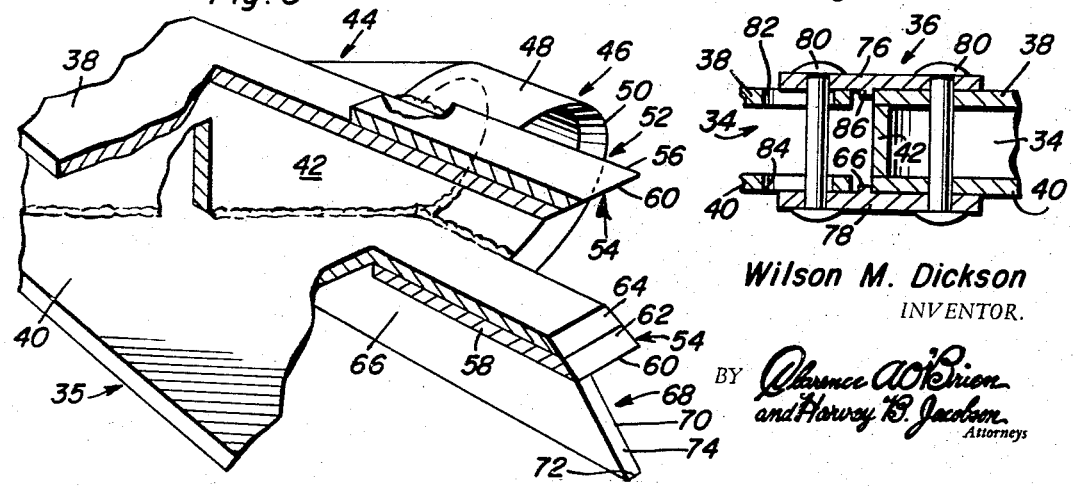
FIGURE 5 is an enlarged partial perspective view of one cutting section of the tool comprising the present invention.
FIGURE 6 is an enlarged partial vertical sectional view taken substantially on the plane of the line 6—6 of FIGURE 2.

Referring to FIGURES 1 and 5, it will be observed that a plurality of steps 52 are included along the outer cutting face of the tool. The forward end of each step 52 extends somewhat ahead of the cutting edge 50 of tooth 48 and, as the forward edge of the step 52 may contact an object in the path of travel of the saw before the cutting edge 50 does, the cutting edges generally denoted by reference numeral 54 are formed thereon. A pair of horizontal blades 56 and 58 are fastened on the outer surfaces of walls 38 and 40 and present the forwardmost cutting edges 60 thereon. The cutting blades 56 and 58 are sloped rearwardly from the cutting edge 60 as indicated by reference numeral 62 and the walls 38 and 40 are also sloped as indicated by reference numeral 64 thereby providing a continuous cutting surface which slopes rearwardly from the cutting edge 60. Thus, the forward edge of the steps 52 each have a pair of horizontally disposed, parallel spaced apart cutting edges thereon.

A plurality of stepped guiding means in the form of runners 66 are provided, one for each cutting section 46. The runners 66 are fastened in perpendicular supporting relationship to the bottom of wall 40 and blade 58 and fastened thereto by conventional fastening means such as by welding or the like. The runners 66 provide a supporting surface for the saw which contacts the ground as the saw is pulled behind the tractor 12. Further, runners 66, by virtue of the placement thereof, will normally contact the objects being cut by the saw as it is pulled behind and offset from the tractor. Hence, the forward edge of each runner 66 is provided with a sloped cutting surface generally designated by reference numeral 68 including a cutting edge 70 on the outside edge of the front face of the runner, a cutting edge 72 and a sloped face 74 sloping away from the cutting edges 70 and 72. Thus, it will be apparent that as the saw 10 is pulled behind the tractor 12, a plurality of cutting edges are presented, including the cutting edges 72, 74, 60 and 50. Further, the runner 66 has a tendency to dig into the ground surface as it is carried thereover and thus eliminates the lateral forces imparted on the tool 10 due to its offset direction of travel from being imparted to the tractor 12.

Referring now to FIGURE 6, the hinge connection 36 may be seen in greater detail. The hinge connection 36 includes a pair of upper and lower substantially flat mounting plates 76 and 78 which are fastened together on the outer surfaces of upper wall 38 and lower wall 40 of adjacent sections 34 by conventional rivet pins 80. Each section 34 has at one end the enlarged mounting holes 82 and 84 in the walls 38 and 40 respectively, through which pin 80 is mounted. The enlarged mounting holes allow for some play about the pin connection and thus adjacent sections 34 will be able to have limited vertical movement as, for example, when the ground surface over which the saw is riding is rough or uneven. Thus, it will be apparent that the rear portion of rear section 34 in FIGURE 6 will be able to move somewhat vertically, either upwardly or downwardly due to the space provided about the rivet pin 80 by enlarged mounting holes 82 and 84. Of course, each section 34 has a like pair of enlarged mounting holes 82 and 84 in the front portion thereof only.

The mounting plates 76 and 78 further include depending flanges 86, which flanges abut the ends of walls 38 and 40 of the front section 34, thus preventing the sections 34 from moving in a counterclockwise direction, when viewing FIGURES 1 and 2. These flanges are necessary to prevent the adjacent section 34 of saw 10 from being swung away from the objects being contacted such as stump 32 thus allowing the saw to operate effectively. However, as will be appreciated, the hinge connections 36 allow the adjacent sections 34 of saw 10 to move laterally apart in a clockwise direction, in viewing FIGURES 1 and 2, thus allowing the tractor 12 to make left turns without having to drag the entire saw 10 through the complete turning arc.

Referring now to FIGURE 8, a front elevational view of a modified form of the invention is illustrated. In this form of the invention, there is provided a cutting tooth 148 similar to the cutting tooth 48 described above. However, the cutting edge 150 of the tooth 148, rather than being vertical and arcuate as in the prior form of the invention, is slanted or sloped rearwardly as indicated by reference numeral 152. Thus, there is provided a forwardmost cutting edge 154 which will enter the object to be cut first, and then the rest of the cutting edge 150 will operate to form a notch therein. However, in all other respects, this embodiment of the invention is similar to the embodiment described above.

In summary of the above description of the invention, there is provided an elongate saw which is adapted to be drawn behind a tractor or other self-propelled device in angularly laterally offset relation thereto so as to contact objects to be cut alongside the path of travel of the tractor. The outer edge of the saw is provided with a plurality of stepped cutting sections, and the saw rides along the surface of the ground on a plurality of stepped runners also having forwardly directed cutting edges thereon to enable the runner to pass through the objects being cut by the saw. The saw is maintained in such laterally angularly offset position from the path of travel of the tractor by a telescoping arm which allows for adjustment of the angle of the saw. Further, the saw is composed of a plurality of sections which are hingedly attached together for lateral movement in only one direction, and vertical movement of adjacent sections in relation to the surface over which the saw is drawn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination tree saw and root plow tool adapted to be drawn by a self-propelled vehicle comprising elongate body means adapted to be drawn by a vehicle, means for positioning said body means in angularly laterally offset relationship with respect to the path of travel of the vehicle, a plurality of cutting means in stepped position on said body means, and means for guiding said body means in a path generally parallel to the path of travel of the vehicle as the vehicle pulls said plow over the ground.

2. The tool of claim 1 wherein said body means comprises a plurality of sections, hinge means connecting adjacent sections for one-way lateral movement therebetween, and means for allowing vertical movement of adjacent sections in relation to the surface over which the saw is drawn and in relation to each other whereby said tool may be freely drawn over uneven ground riding surfaces.

3. The tool of claim 1 wherein said positioning means comprises telescoping arm means connected to the tool at one end and adapted to be connected to the vehicle at the other end, the length of said telescoping arm means being selectively changeable whereby the angular position of said tool with respect to the direction of travel of the vehicle is variable.

4. The tool of claim 1 wherein each of said cutting means comprises first blade means formed in said body means, all of said first blade means comprising a plurality of steps along one longitudinal side of said body means, and second blade means positioned laterally outwardly and rearwardly of said first blade means, all of said second blade means comprising a second plurality of steps positioned laterally and rearwardly of said first plurality of steps.

5. The tool of claim 4 including means for conveying wood chips cut by said cutting means laterally outwardly of the other longitudinal side of said body means.

6. The tool of claim 1 wherein said guiding means comprises a plurality of runners positioned to support said body means, each of said runners positioned adjacent one of said cutting means, said runners comprising a plurality of steps adjacent said step cutting means.

7. The tool of claim 6 wherein said runners include blade means on the leading edge thereof.

8. An attachment for self-propelled land vehicles comprising a generally horizontally disposed body means, means for maintaining said body means laterally offset of the vehicle, a plurality of cutting surfaces on the outer side of said body means, said cutting sections including at least one blade means, and means for discharging chips laterally outwardly of the inner side of said body means.

9. The combination of claim 8 wherein said cutting sections include at least one horizontally disposed blade means and a generally arcuate blade means, said generally arcuate blade means being disposed rearwardly and laterally outwardly of said horizontally disposed blade means.

10. The combination of claim 9 including means for supporting said body means, said body means comprising a plurality of body sections, hinge means for joining said body sections for one-way lateral movement, and means for allowing vertical movement between adjacent body sections.

11. The combination of claim 10 wherein said supporting means comprises a plurality of runners, each of said runners positioned adjacent a cutting section, said runners including blade means on the leading edge thereof whereby each of said cutting sections provides a plurality of cutting surfaces.

12. The combination of claim 8 wherein said cutting sections comprise a plurality of steps on the outer side of said attachment, said cutting sections including a plurality of blade means thereon, and said blade means being disposed normally to the path of travel of the vehicle.

References Cited

UNITED STATES PATENTS

| | | |
|---|---|---|
| 2,512,666 | 6/1950 | Meske. |
| 2,747,623 | 5/1956 | Cox. |
| 3,022,588 | 7/1962 | Brown. |
| 3,301,285 | 1/1967 | Cline _____ 144—34 |

WILLIAM W. DYER, Jr., *Primary Examiner.*

W. D. BRAY, *Assistant Examiner.*